United States Patent
Goto et al.

(10) Patent No.: US 9,311,606 B2
(45) Date of Patent: Apr. 12, 2016

(54) QUANTUM COMPUTER AND QUANTUM MEMORY

(75) Inventors: Hayato Goto, Kawasaki (JP); Satoshi Mitsugi, Kawasaki (JP); Kouichi Ichimura, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1064 days.

(21) Appl. No.: 13/417,881

(22) Filed: Mar. 12, 2012

(65) Prior Publication Data
US 2012/0170091 A1    Jul. 5, 2012

Related U.S. Application Data

(63) Continuation of application No. PCT/JP2009/066826, filed on Sep. 28, 2009.

(51) Int. Cl.
*G06E 3/00*    (2006.01)
*G06N 99/00*   (2010.01)
*B82Y 10/00*   (2011.01)

(52) U.S. Cl.
CPC .............. *G06N 99/002* (2013.01); *B82Y 10/00* (2013.01)

(58) Field of Classification Search
CPC ......... H04L 67/10; H04L 67/42; H04L 67/02; H04L 65/60; H04L 67/18; H04L 51/04; H04L 51/046; H04L 65/403; H04L 65/602; H04L 67/06; H04L 67/1097; H04L 67/22; H04L 51/08; H04L 51/12; H04L 65/608; H04L 67/16; H04L 67/24

USPC ............ 359/107–108, 560–561; 257/25, 321, 257/432

See application file for complete search history.

(56) References Cited

U.S. PATENT DOCUMENTS

| | | | |
|---|---|---|---|
| 5,535,232 A | | 7/1996 | Bowman et al. |
| 5,746,942 A | * | 5/1998 | Bowman ................... H01S 3/16 252/301.4 H |

(Continued)

FOREIGN PATENT DOCUMENTS

| | | |
|---|---|---|
| JP | 9-139539 | 5/1997 |
| JP | 2001-209083 | 8/2001 |

(Continued)

OTHER PUBLICATIONS

International Preliminary Report on Patentability issued Apr. 19, 2012 in PCT/JP2009/066826, filed Sep. 28, 2009.

(Continued)

*Primary Examiner* — Thomas K Pham
*Assistant Examiner* — Sharrief Broome
(74) *Attorney, Agent, or Firm* — Oblon, McClelland, Maier & Neustadt, L.L.P (57) ABSTRACT

According to one embodiment, a quantum computer includes a crystal, an optical resonator, and a light source. A host crystal included in the crystal satisfying three conditions a first condition that maximum phonon energy of the host crystal is low, and so that a homogenous broadening of a $^3F_3(1)$ level of the $Pr^{3+}$ ion resulting from relaxation due to phonon emission is smaller than respective hyperfine splits of a $^3H_4(1)$ level and the $^3F_3(1)$ level of the $Pr^{3+}$ ion, a second condition that a site of the $Pr^{3+}$ ion does not have inversion symmetry, and the $Pr^{3+}$ ion has a Stark level in which the $^3H_4(1)$ level and the $^3F_3(1)$ level of the $Pr^{3+}$ ion are not degenerate, and a third condition that each atom in the host crystal has no electronic magnetic moment.

4 Claims, 7 Drawing Sheets

(56) References Cited

U.S. PATENT DOCUMENTS

| | | | | |
|---|---|---|---|---|
| 5,898,720 | A | * | 4/1999 | Yamamoto ............ B82Y 20/00 359/244 |
| 6,800,837 | B1 | * | 10/2004 | Ichimura ............... B82Y 10/00 250/207 |
| 7,126,106 | B2 | | 10/2006 | Goto et al. |
| 7,437,533 | B2 | * | 10/2008 | Ichimura ............... B82Y 10/00 250/526 |
| 7,447,719 | B2 | | 11/2008 | Goto et al. |
| 7,826,115 | B2 | | 11/2010 | Goto et al. |

FOREIGN PATENT DOCUMENTS

| | | |
|---|---|---|
| JP | 4047795 | 2/2008 |
| JP | 2008-197416 | 8/2008 |
| JP | 4316515 | 8/2009 |

OTHER PUBLICATIONS

Written Opinion of the International Searching Authority issued Nov. 10, 2009, in PCT/JP2009/066826, filed Sep. 28, 2009.

International Search Report issued on Nov. 10, 2009 for PCT/JP2009/066826 filed on Sep. 28, 2009.

International Written Opinion issued on for Nov. 10, 2009 PCT/JP2009/066826 filed on Sep. 28, 2009.

E. Fraval et al.; "Dynamic Decoherence Control of a Solid-State Nuclear-Quadrupole Qubit"; Physical Review Letters, 95, 030506-1-030506-4, Jul. 15, 2005.

Yun-Feng Xiao et al.; "Quantum CPF gates between rare earth ions through measurement"; Physics Letters A 330, 137-141, Aug. 12, 2004.

Y. Sun et al.; "Recent progress in developing new rare earth materials for hole burning and coherent transient applications"; Journal of Luminescence 98, 281-287, 2002.

William F. Krupke; "Optical Absorption and Fluorescence Intensities in Several Rare-Earth-Doped $Y_2O_3$ and $LaF_3$ Single Crystals"; Physical Review vol. 145 No. 1, 325-337, May 6, 1966.

C. Li et al.; "Luminescence properties of the $Tm^{3+}$ doped silicates $Y_2SiO_5$, $CaY_4(SiO_4)_3O$ and $SrY_4(SiO_4)_3O$"; Journal of Luminescence 62, 157-171, 1994.

A.Z. Genack et al.; "Coherent Transients by Optical Phase Switching: Dephasing in $LaCl_3:Pr^{3+}$"; Physical Review Letters vol. 45 No. 6, 438-441, Aug. 11, 1980.

Yun-Feng Xiao et al.; "Realizing quantum controlled phase flip through cavity QED"; Physical Review A 70, 042314-1-042314-5, Oct. 25, 2004.

L.-M. Duan et al.; "Scalable Photonic Quantum Computation through Cavity-Assisted Interactions"; Physical Review Letters vol. 92 No. 12, 127902-1-127902-4, Mar. 26, 2004.

J.J. Longdell et al.; "Stopped Light with Storage Times Greater than One Second Using Electromagnetically Induced Transparency in a Solid"; Physical Review Letters 95, 063601-1-063601-4, Aug. 5, 2005.

L.A. Riseberg et al.; "Progress in Optics"; vol. XIV, 91, 1976, pp. 116-133.

Joseph Ganem et al.; "Thulium cross-relaxation in a low phonon energy crystalline host"; Physical Review B 66, 245101-1-245101-15, Dec. 4, 2002.

\* cited by examiner

QUANTUM COMPUTER AND QUANTUM MEMORY

CROSS-REFERENCE TO RELATED APPLICATIONS

This application is a Continuation Application of PCT Application No. PCT/JP2009/066826, filed Sep. 28, 2009, the entire contents of which are incorporated herein by reference.

FIELD

Embodiments described herein relate generally to a quantum computer and a quantum memory utilizing rare-earth ions in a crystal.

BACKGROUND

Researches concerning the use of rare-earth ions in a crystal as a laser medium have been made for a long time. However, in view of the fact that the coherence times of the optical transition and hyperfine transition of these ions are longer than the other solid materials, applications of the ions to quantum information technology have recently been developed (see, for example, Y.-F. Xiao, Z.-F. Han, Y. Yang. and G.-C. Guo, Phys. Lett. A 330, 137 (2004)).

When certain optical transitions of a rare-earth ion in a crystal are utilized for devices (hereinafter referred to as "quantum information devices"), such as quantum computers, quantum memories, used in quantum information technology, it is very convenient if their transition wavelengths fall within the optical telecommunication wavelength range (1260 to 1.625 nm), for the following reasons 1 to 3:

1. The existing semiconductor lasers can be utilized.
2. When an optical resonator that has a resonator mode that resonates with one of the transitions is used to perform a quantum gate operation, the wavelength corresponding to the resonator mode is longer than that of visible light, whereby scattering loss in the resonator is less than the case of using the visible light.
3. Those devices are suitable for applications to telecommunication devices (such as quantum memories and distributed quantum computers used for quantum communications and quantum cryptography).

As a transition within the optical telecommunication wavelength range well examined so far, $^4I_{15/2}$-$^4I_{13/2}$ transition (approx. 1550 nm) of $Er^{3+}$ can be taken. This is, however, not a satisfactory transition if it is applied to quantum information devices, for the following reasons (i) to (iv):

(i) Since $Er^{3+}$ is a so-called Kramers ion having an odd number of 4f electrons, it has a large electronic magnetic moment in its ground states, and therefore, a large magnetic field must be applied to obtain a long coherence time (for optical transition) (see, for example, Y. Sun et al., J. Lumin. 98, 281 (2002)).

(ii) When the electronic magnetic moments in the ground states are used as quantum bits, the coherence time is relatively short (compared to, for example, the case of using the nuclear spins of a $Pr^{3+}$ ion of $Pr^{3+}$:$Y_2SiO_5$).

(iii) From the viewpoint of coherence time, it is desirable to use nuclear spins (hyperfine levels) as quantum bits. It is known that the coherence time of each nuclear spin can be extended if an appropriate magnetic field is applied (see, for example, E. Fraval, M. J. Sellars, and J. J. Longdell, Phys. Rev. Lett. 95, 030506 (2005)). However, this method cannot be employed in the case of $Er^{3+}$ because of the above-mentioned large magnetic field that must be applied to reduce the influence of the electronic magnetic moment.

(iv) Since the transition dipole moment is small, if an optical resonator is utilized to, for example, perform a quantum gate operation, the coupling constant with the resonator mode will be small.

The first-mentioned three of the disadvantages of the $Er^{3+}$ ion can be overcome if a non-Kramers ion having an even number of 4f electrons is used. The $^3H_4$-$^3F_3$ transition of a $Pr^{3+}$ ion is the most promising among non-Kramers ion transitions at an optical telecommunication wavelength. Although the $Pr^{3+}$ ion has the $^3H_4$-$^3F_4$ transition as another candidate, the $^3H_4$-$^3F_3$ transition of the $Pr^{3+}$ ion is more desirable in consideration of the influence of multi-phonon relaxation described later, and therefore only the $^3H_4$-$^3F_3$ transition will now be considered. Further, the $^3H_4$-$^3F_3$ transition of the $Pr^{3+}$ ion has a relatively large transition dipole moment (see, for example, "W. F. Krupke, Phys. Rev. 145, 325 (1966)." However, the applications of the $^3H_4$-$^3F_3$ transition of the $Pr^{3+}$ ion to quantum information devices have not been proposed yet.

DETAILED DESCRIPTION

Referring to the accompanying drawings, embodiments and examples will be described in detail. In the embodiments and examples, like reference numbers denote like elements, and duplicate explanation will be avoided.

The embodiments have been developed in light of the above, and aim to provide a quantum computer and a quantum memory that can appropriately and conveniently process quantum information.

The quantum computer and quantum memory of the embodiments can more appropriately and conveniently process quantum information.

As a past example of application of the $^3F_3$ level of a $Pr^{3+}$ ion, application to a long-wavelength laser can be taken (see, for example, U.S. Pat. No. 5,535,232). The problem that will occur when the $^3F_3$ level of the $Pr^{3+}$ ion is utilized lies in that since the $^3F_2$ level of the $Pr^{3+}$ ion exists just below the $^3F_3$ level (about 1300 $cm^{-1}$ ("$cm^{-1}$" is an energy unit, see Chronological Scientific Tables)), multi-phonon relaxation, in which a plurality of phonons are emitted to reach a relaxed state, relatively quickly occurs. To overcome this problem, U.S. Pat. No. 5,535,232 has proposed using, as a host crystal, a crystal of a relatively low maximum phonon energy (not higher than 300 $cm^{-1}$), such as $LaCl_3$, $LaBr_3$, $LaI_3$, $YCl_3$ or $LuCl_3$. Particularly detailed researches were performed using $Pr^{3+}:LaCl_3$. This is because the maximum phonon energy of $Pr^{3+}:LaCl_3$ is as low as 210 $cm^{-1}$, and $Pr^{3+}$ and $La^{3+}$ have close ion diameters, which enables the concentration of $Pr^{3+}$ ions in $Pr^{3+}:LaCl_3$ to be relatively easily increased, and therefore makes $Pr^{3+}:LaCl_3$ suitable for lasers.

Similarly when the $^3H_4$-$^3F_3$ transition of a $Pr^{3+}$ ion is applied to a quantum information device, attention must be paid to a host crystal. For instance, when $Pr^{3+}:Y_2SiO_5$, which has been studied best as a material to be applied to quantum information devices and is known to have a nuclear spin whose coherence time can be lengthened significantly, is utilized, multi-phonon relaxation of the $^3F_3$ level will become very fast because of the high maximum phonon energy of $Y_2SiO_5$ (see, for example, "C. Li et al., J. Lumin. 62, 157 (1994)"). Because of this, the $^3F_3$ level of $Pr^{3+}:Y_2SiO_5$ is not suitable for quantum information devices. On the other hand, it is not necessarily true, in view of coherence, that the crystals of a relatively low maximum phonon energy disclosed in U.S. Pat. No. 5,535,232 are suitable for the quantum information devices. For instance, if $Pr^{3+}:LaCl_3$, which has been studied best as a laser beam, is used, the ground states of $Pr^{3+}$ are degenerate for the total angular momentum of electrons and have a large electronic magnetic moment because of relatively high site symmetry of $LaCl_3$, and therefore the coherence time of optical transition of $Pr^{3+}:LaCl_3$ is relatively short (compared to $Pr^{3+}:Y_2SiO_5$ or $Pr^{3+}:LaF_3$) (see, for example, "A. Z. Genack et al., Phys. Rev. Lett. 45, 438 (1980)"). Further, $Pr^{3+}:LaCl_3$ is also not suitable for quantum information devices because the magnetic moment of the nuclear spin of La is relatively large. (The main factor for causing decoherence of rare-earth ions in a crystal at low temperature is magnetic fluctuation due to the electronic magnetic moments and/or nuclear spins of the crystal.) Thus, it is an unobvious and important point what is used as the host crystal when the $^3H_4$-$^3F_3$ transition of a $Pr^{3+}$ ion is applied to a quantum information device.

Consideration will now be given to the conditions needed for a host crystal when the $^3H_4$-$^3F_3$ transition of a $Pr^{3+}$ ion is applied to quantum information devices (a quantum computer and a quantum memory).

Firstly, a notice associated with "Stark level" will be given. In free ions, $^{2S+1}L_J$ levels are degenerate in a (2J+1)-fold manner because of the independence of an element of the total angular momentum of electrons. This degeneracy is split in the crystal field of a crystal, and the number of split levels depends upon whether the doped rare-earth ion is a Kramers ion or a non-Kramers ion, and upon the site symmetry of the dopant. The levels split in the crystal field are called Stark levels. If (2J+1)-fold degeneracy due to the independence of the element of the total angular momentum of electrons is not completely split, some Stark levels are still degenerate. Thus, the resultant Stark levels are classified into "degenerate Stark levels" and "non-degenerate Stark levels." The resultant Stark levels are numbered in an energy-increasing order. For instance, the lowest energy level is set to $^{2S+1}L_J(1)$, and the second lowest energy level is set to $^{2S+1}L_J(2)$. Each Stark level $^{2S+1}L_J(j)$ (j>1) higher than the lowest energy level $^{2S+1}L_J(1)$ is relaxed into the lowest energy level $^{2S+1}L_J(1)$ very quickly by phonon relaxation. On the other hand, in general, the life time of $^{2S+1}L_J(1)$ is long. Accordingly, strictly speaking, the transition utilized in the quantum information devices of the embodiments is $^3H_4(1)$-$^3F_3(1)$ transition. However, if not otherwise specified, $^3H_4$-$^3F_3$ transition means $^3H_4(1)$-$^3F_3(1)$ transition.

It is the influence of multi-phonon relaxation that must be firstly considered when the $^3H_4$-$^3F_3$ transition of a $Pr^{3+}$ ion is utilized. Since the $^3F_2$ level of the $Pr^{3+}$ ion exists just below the $^3F_3$ level (about 1300 $cm^{-1}$ in energy), multi-phonon relaxation, in which a plurality of phonons are emitted to reach a relaxed state, relatively quickly occurs. To overcome this disadvantage, in the prior art long-wavelength lasers (disclosed in, for example, U.S. Pat. No. 5,535,232), the use of a crystal having a relatively low maximum phonon energy (not higher than 300 $cm^{-1}$) as a host crystal has been proposed. Similarly in the quantum information devices of the embodiments, a similar condition is required. In the case of applying the use of the $^3H_4$-$^3F_3$ transition of a $Pr^{3+}$ ion to lasers, it is sufficient if the lifetime of the excited state of $Pr^{3+}$ is relatively long. However, in the case of applying the use of the $^3H_4$-$^3F_3$ transition of the $Pr^{3+}$ ion to the quantum information devices of the embodiments, in order to utilize hyperfine levels, it is necessary to satisfy the condition that "the homogenous broadening of the $^3F_3(1)$ level due to multi-phonon relaxation is smaller than the hyperfine splits of the $^3H_4(1)$ and $^3F_3(1)$ levels." Accordingly, the maximum phonon energy of a host crystal must be sufficiently low to satisfy this condition. In contrast, in the application to lasers, it is not necessary to distinguish hyperfine levels (actually, hyperfine levels are not distinguished), and therefore the above condition does not have to be satisfied.

It is the site symmetry of doped $Pr^{3+}$ that must be secondly considered. As a condition for enabling optically forbidden 4f-4f transition to be allowed, the site of the doped $Pr^{3+}$ is required to have no inversion symmetry. Further, in view of coherence, both the $^3H_4(1)$ and $^3F_3(1)$ levels must be non-degenerate Stark levels. This is because if they are degenerate, they are liable to be influenced by ambient magnetic fluctuation (in particular, magnetic fluctuation due to the magnetic moments of the electron and nuclear spins of the host) since large electronic magnetic moments exist at the degenerate Stark levels, whereby the rate of decoherence is increased. Whether Stark levels are degenerate depends upon each host. If the site symmetry is one of $C_1$, $C_2$, $C_S$, $C_{2V}$ and $D_2$, degeneracy of all Stark levels is removed, which can serve as a sufficient condition (in the case of a non-Kramers ion, such as $Pr^{3+}$, that has an even number of 4f electrons, degeneracy is all removed, while in the case of a Kramers ion that has an odd number of 4f electrons, double degeneracies are left). At this time, the above-mentioned condition associated with the inversion symmetry is automatically satisfied. (In the above-mentioned case of application to lasers, it is not necessary to consider the coherence time, and hence crystal symmetry is irrelevant.)

Lastly, it is necessary to consider the magnetic moment density of the host. The main factor of de-coherence of a rare-earth ion in a crystal at low temperature is magnetic fluctuation due to the electron and nuclear spins of the host.

The magnetic moment of the electronic magnetic moment is significantly greater (about 1000 times) than that of the nuclear spin, ions are required to have no electronic magnetic moment. It is more desirable if the magnetic moment density due to the nuclear spin is low. However, note that in the specification, conditions for the nuclear spin are not regarded as absolute necessary conditions, because the magnetic moment of the nuclear spin is small.

The above-mentioned conditions required for the a host crystal when the $^3H_4$-$^3F_3$ transition of a $Pr^{3+}$ ion in the crystal is utilized for quantum information devices are summarized as follows (the following three conditions will hereinafter be referred to as "the three conditions for the host crystal used in the quantum information devices of the embodiments"):

1. The maximum phonon energy of the host crystal is sufficiently low, and the condition that "the homogenous broadening of the $^3F_3(1)$ level due to multi-phonon relaxation is smaller than the hyperfine splits of the $^3H_4(1)$ and $^3F_3(1)$ levels" is satisfied.

2. The site of doped $Pr^{3+}$ has no inversion symmetry, and the $^3H_4(1)$ and $^3F_3(1)$ levels of the doped $Pr^{3+}$ are non-degenerate Stark levels ($C_1$, $C_2$, $C_S$, $C_{2V}$ and $D_2$ are sufficient conditions).

3. Each atom (ion) of the host crystal has no electronic magnetic moments.

Host crystal candidates that satisfy the above conditions will be described. The most important candidate is $YCl_3$ for the reason below.

Firstly, consideration will be given to the first condition that the maximum phonon energy is sufficiently low. In the case of $LaF_3$ having a maximum phonon energy of 350 cm$^{-1}$, the $^3F_3$-level multi-phonon relaxation rate of $Pr^{3+}$ is approx. 1 MHz (see, for example, "L. A. Riseberg and M. J. Weber, Progress in optics XIV, 91 (1976), edited by E. Wolf"), which is substantially the same as that of hyperfine split. Therefore, the maximum phonon energy must be lower than 350 cm$^{-1}$. This is a rather tough condition. Except for halides, a crystal that satisfies this condition is little known. The possibility of the existence of such a crystal is not zero. However, it is considered difficult for even such a crystal to simultaneously satisfy the other two conditions, as well as the first-mentioned one. The maximum phonon energy of $YCl_3$ is approx. 260 cm$^{-1}$, and the multi-phonon relaxation rate of the $^3F_3$ level of $Pr^{3+}$ is approx. 100 Hz (see, for example, "J. Ganem, Phys. Rev. B 66, 245101 (2002)"), which satisfies the first condition. Further, unlike $LaCl_3$ well studied in the field of lasers, the site symmetry of $Pr^{3+}$ in $YCl_3$ is $C_2$, which satisfies the second condition (in the case of $LaCl_3$, the site symmetry is $C_{3h}$, and the ground states are degenerate and have electronic magnetic moments, consequently $LaCl_3$ is excluded because of the second condition). Lastly, both $Y^{3+}$ and $Cl^-$ have no electronic magnetic moment. Thus, these ions satisfy the third condition. Further, $Y^{3+}$ and $Cl^-$ have nuclear spins of smallest magnetic moments among ions having a valence of +3 and ions having a valence of −1 (i.e., halogens), respectively, and therefore the magnetic moment density of $YCl_3$ is as low as $20.2 \times 10^{21} \mu_N/cm^3$ ($\mu_N$: nuclear magneton). In view of the above, $YCl_3$ is regarded as the most promising candidate.

$LuCl_3$ is another candidate. In this material, Y in $YCl_3$ is replaced with Lu that is heavier than Y, and hence the maximum phonon energy is lower than 260 cm$^{-1}$, which satisfies the first condition.

The site symmetry of $LuCl_3$ is $C_2$, which is the same as that of $YCl_3$, and hence also satisfies the second condition. Further, since $LuCl_3$ has no electronic magnetic moment, it satisfies the third condition, too. In addition, the magnetic moment density of $LuCl_3$ is $38.9 \times 10^{21} \mu_N/cm^3$. This value is relatively low, although greater than that of $YCl_3$.

A notice associated with the relationship between the embodiments and the past researches will be given. In the specification of U.S. Pat. No. 5,535,232, $YCl_3$ and $LuCl_3$ are taken as candidates for the host crystal that is used to utilize the $^3F_3$ level of a $Pr^{3+}$ ion for lasers. However, these materials are merely taken as materials similar to $LaCl_3$ (i.e., as crystal examples that have a low maximum phonon energy), and are not selected in consideration of the above-mentioned conditions for quantum information devices. Actually, in the above speculation, $LaCl_3$, which has been studied in most detail in the field of lasers, is excluded from the candidates. (Namely, the past researches do not provide sufficient information for achieving the quantum information devices of the embodiments, and it is not easy to exactly conceive the quantum information devices of the embodiments from the prior art.) Further, the embodiments aim to provide quantum information devices, and a condition (first condition) has been contrived to utilize the nuclear spin (hyperfine level) of the $Pr^{3+}$ ion and to operate the quantum state of the nuclear spin by a laser. In the past researches in which the $^3F_3$ level of a $Pr^{3+}$ ion was utilized, it was not necessary to distinguish and operate hyperfine levels, and hence there was no condition corresponding to the first condition. Thus, the past laser researches including U.S. Pat. No. 5,535,232 do not even suggest the quantum information devices of the embodiments.

As quantum information devices utilizing the $^3H_4$-$^3F_3$ transition of a $Pr^{3+}$ ion in a crystal, a quantum computer and a quantum memory for photons are possible. These devices will be described in detail in the first and second embodiments below.

First Embodiment

A description will be given of a quantum computer according to a first embodiment, in which the $^3H_1$-$^3F_3$ transition of a $Pr^{3+}$ ion in a crystal is utilized. In the first embodiment, $YCl_3$ is used as the host crystal that satisfies the above-mentioned three conditions. However, other materials, such as $LuCl_3$, which satisfy the three conditions of the host crystal, are also usable.

Figure 1:
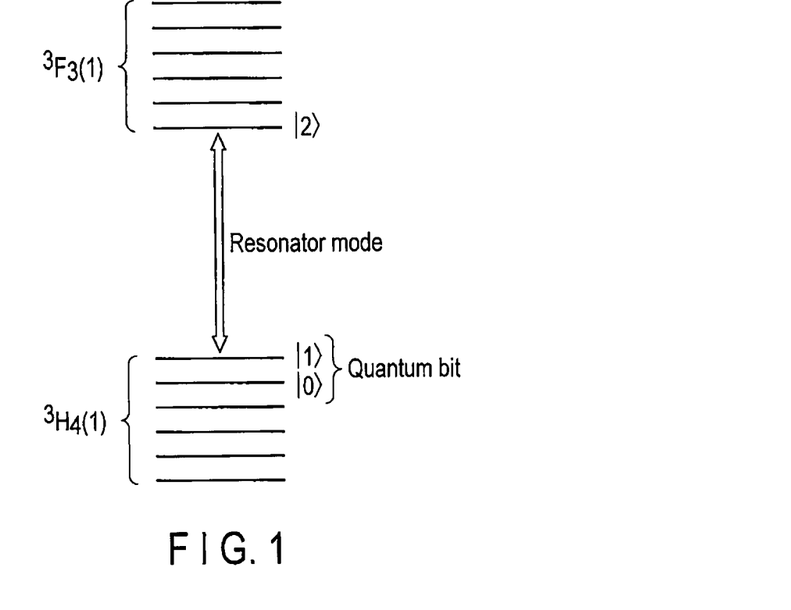
FIG. 1 is a view illustrating a quantum bit, and coupling of optical transition of a $Pr^{3+}$ ion and a resonator mode in a quantum computer, according to a first embodiment.

A lot of quantum computers utilizing $Pr^{3+}$ ions in a crystal have been proposed so far (see, for example, JP-A 2001-209083 (KOKAI), Japanese Patent No. 4047795, Japanese Patent No. 4316515, JP-A 2008-197416 (KOKAI)). In these computers, a quantum bit is expressed by two (for example, in the example of FIG. 1, |0> and |1>) of the six hyperfine levels of $^3H_4(1)$ of a $Pr^{3+}$ ion. Further, in these quantum computers, an optical resonator is used for performing a two-quantum-bit gate operation. As the quantum computer of the first embodiment, one of the quantum computers disclosed in JP-A 2001-209083 (KOKAI), Japanese Patent No. 4047795, Japanese Patent No. 4316515 and JP-A 2008-197416 (KOKAI) is used (see FIG. 1). The method of utilizing an optical resonator for executing the two-quantum-bit gate operation is not limited to the methods disclosed in these documents.

The quantum computer of the first embodiment is characterized in that the $^3H_4$-$^3F_3$ transition of a $Pr^{3+}$ ion is utilized as an optical transition to be coupled to the resonator mode (see FIG. 1), and that $YCl_3$ is used as the host crystal that satisfies the above-mentioned three conditions. (In FIG. 1, the upper two of the six hyperfine levels of $^3H_4(1)$ are used as |0> and |1>, and the lowest one of the six hyperfine levels of $^3F_3(1)$ is used as |2>. However, other hyperfine levels may be used as |0>, |1> and |2>.)

Figure 2:
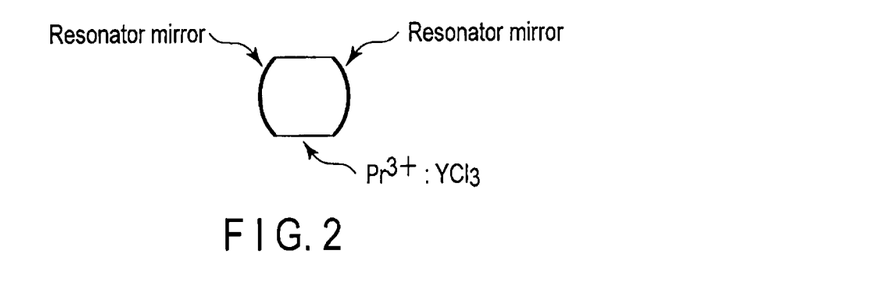
FIG. 2 is a view illustrating an optical resonator utilized in the quantum computer of the first embodiment.

As shown in FIG. 2, the optical resonator is produced by mirror-processing the surface of $Pr^{3+}$:$YCl_3$ crystal. Note that since $YCl_3$ is a deliquescent material, the portion thereof other than the mirror-processed portion is also coated. A very stable and frequency tunable semiconductor laser with an external resonator (a frequency fluctuation of approx. 1 kHz or less), which can supply a laser beam resonating with the $^3H_4$-$^3F_3$ transition, is used as a light source. The fact that a semiconductor laser can be used as a light source is another advantage of the first embodiment. In a past example, a ring dye laser is used as the light source to utilize the $^3H_4$-$^1D_2$ transition of a $Pr^{3+}$ ion. The elements other than the optical resonator and the light source may be the same as those disclosed in JP-A 2001-209083 (KOKAI), Japanese Patent No. 4047795, Japanese Patent No. 4316515 and JP-A 2008-197416 (KOKAI), and the quantum computing method employed in the first embodiment may be the same as one of the methods disclosed in these documents. When the method disclosed in JP-A 2008-197416 (KOKAI) is used, the $^3H_4$-$^1D_2$ transition that is often utilized for a $Pr^{3+}$ ion can be utilized as another optical transition necessary to individually operate quantum bits. For this purpose, a ring dye laser can be used as in JP-A 2001-209083 (KOKAI), Japanese Patent No. 4047795, Japanese Patent No. 4316515 and JP-A 2008-197416 (KOKAI).

A description will now be given of the quantum computer of the embodiment, and a multi-control unitary gate for use in the computer.

First Example

Figure 3:
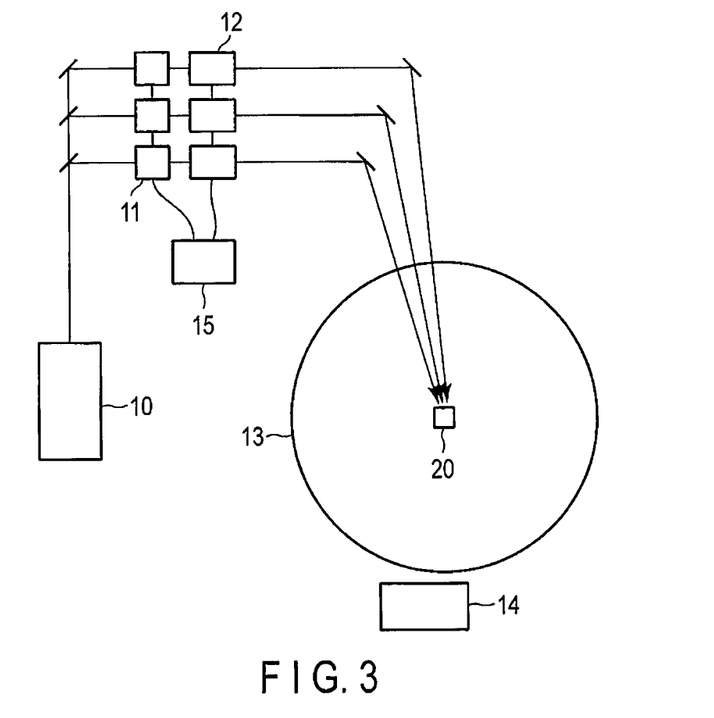
FIG. 3 is a view illustrating the structure of a multi-control unitary gate used in a first example.

FIG. 3 shows the structure of a multi-control unitary gate according to a first example. An optical resonator obtained by mirror-processing the surface of $YCl_3$ crystal doped with $Pr^{3+}$ (i.e., $Pr^{3+}$:$YCl_3$ crystal) is prepared as a sample 20, and the hyperfine levels of $Pr^{3+}$ are used as a physical system.

As a light source 10, a semiconductor laser with an external resonator is used. The light pulse sequences needed for a multi-control unitary gate operation method of the embodiments can be realized by frequency shift and intensity/phase modulation. Therefore, an acoustooptic modulator (AOM) 11 and an electro-optic modulator (EOM) 12 are used for realizing the light pulse sequences. Further, a control system 15 is employed for synchronizing the AOM 11 and the EOM 12 so that they appropriately set the amplitude and phase of each light pulse, respectively.

The sample 20 is placed in a cryostat 13. Within the cryostat 13, the temperature is set at an absolute temperature of 1.4 K, using liquid helium.

In order to read the result of quantum computation, a highly sensitive photodetector 14 is provided outside the cryostat 13 to detect the light resonating with the level to be read.

A Toffoli gate operation performed by the apparatus of FIG. 3 will be described. The Toffoli gate operation is an operation of replacing target bits |0> and |1> with each other only when control bits 1 and 2 are both |1>.

Figure 4:
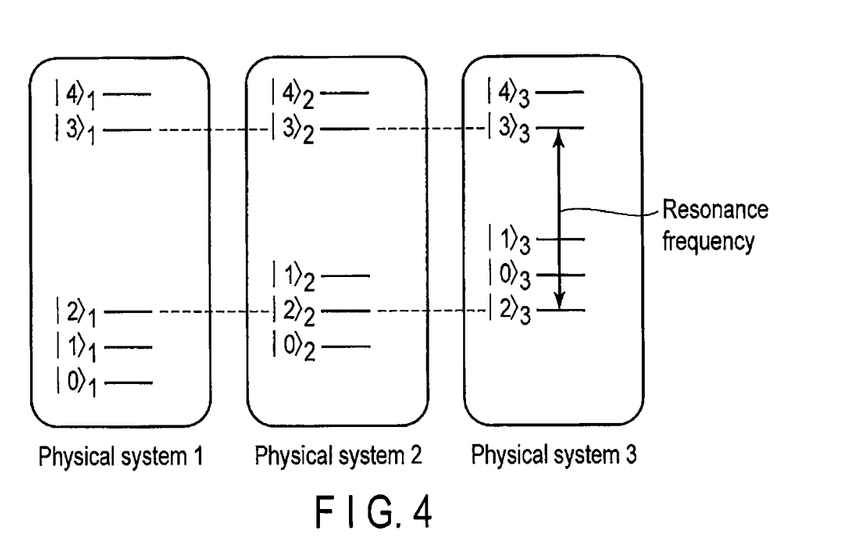
FIG. 4 is a view illustrating the energy levels of three $Pr^{3+}$ ions utilized for a quantum Toffoli gate in the first example.

In this gate operation, firstly, ions appropriate for the operation are selected. More specifically, a sample with a sufficiently low concentration of $Pr^{3+}$ is prepared, and is operated in a frequency band far from the center of the inhomogenous broadening, thereby causing only several ions to resonate with the resonator. Three of these ions, which have the levels shown in FIG. 4, are used. States of two levels that resonate with the resonator mode are set to $|2>_k$ and $|3>_k$ (k=1, 2, 3), and states of two lower levels included in states other than $|2>_k$ and $|3>_k$ are set to $|0>_k$ and $|1>_k$, and one higher level state is set to $|4>_k$. In this embodiment, ions are selected so that the lower level states that resonate with the resonator can be set to such states of different-nuclear-spin hyperfine levels as shown in FIG. 4, in order to classify the level states based on frequencies. However, the states of ions may be selected within the inhomogenous broadening of same-nuclear-spin hyperfine levels.

Subsequently, an operation for preparing an appropriate initial state is performed. Light beams that resonate with transition between $|2>_k$ (k=1, 2, 3) and each of higher level states other than $|3>_k$ and $|4>_k$ are emitted, thereby pumping out the population of the lower level states of all ions that resonate with the resonator mode, to lower level states that do not resonate with the resonator mode. While the light beams resonating with transitions between $|2>_k$ (k=1, 2, 3) and the above-mentioned level states are being emitted, light beams resonating with transitions between $|1>_1$ and $|3>_1$, between $|1>_2$ and $|4>_2$ and between $|1>_3$ and $|4>_3$ are emitted, thereby concentrating the population of the states of the three ion on $|0>_1$, $|0>_2$ and $|0>_3$. This is initialization. Similarly, the states of the three ion can be prepared to $|1>_1$, $|0>_2$ and $|0>_3$, or to $|0>_1$, $|1>_2$ and $|0>_3$, or to $|1>_1$, $|1>_2$ and $|0>_3$. In the description below, quantum Toffoli gate operation is performed in the four cases where the initial states are set to ($|0>_1$, $|0>_2$, $|0>_3$), ($|1>_1$, $|0>_2$, $|0>_3$), ($|0>_1$, $|1>_2$, $|0>_3$) and ($|1>_1$, $|1>_2$, $|0>_3$). After that, measurement is performed to confirm whether correct operation is performed. If quantum bit 3 is in a state of $|1>_3$ only when the initial states are ($|1>_1$, $|1>_2$ and $|0>_3$), and is kept in $|0>_3$ in the other cases, it is conformed that correct operation is performed.

Figure 5:
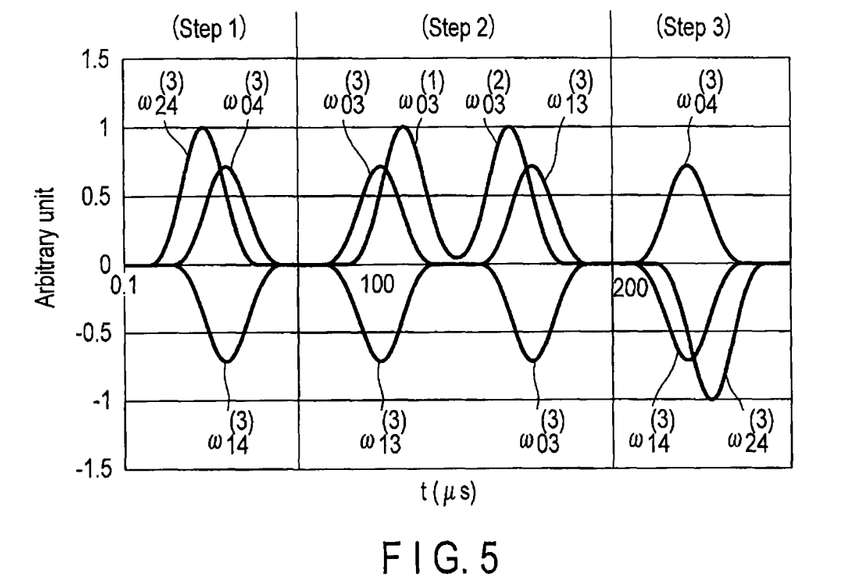
FIG. 5 is a view illustrating the envelopes of a light pulse sequence used for realizing the quantum Toffoli gate in the first example.

Such a Toffoli gate can be performed with the pulse sequences shown in FIG. 5. See Japanese Patent No. 4047795 for the detailed procedure.

Second Example

A description will firstly be given of the principle of a quantum computer according to a second example.

When an atom exists in an optical resonator and is strongly coupled to the resonator, a phenomenon will occur in which when the light resonating with the resonator is applied to the resonator, the intensity of the light in the resonator can change compared to the case where no atom exists. In general, it is said that the coupling between the resonator and an atom is strong when the coupling constant g of the coupling is greater than the relaxation rate κ of the resonator and the relaxation rate γ of the atom (g>κ, γ).

Namely, in this phenomenon, if there is no atom that strongly couples to the resonator, incident light resonates with the resonator to thereby enter the same, whereas if there is an atom that strongly couples to the resonator, the light cannot enter the resonator and is reflected therefrom. This phenomenon depends upon the intensity of the incident light. If the intensity of the incident light is too high, changes due to existence or nonexistence of an atom will not occur, and therefore the incident light must be weak sufficiently to cause the change. As will be described later, if this effect is utilized, a control phase-flip gate for a quantum bit expressed by polarization of a photon and a quantum bit expressed by the ground states of an atom can be realized.

The control phase-flip gate (also called CZ gate) is a type of universal gate. By combining the control phase-flip gate operation with a one-quantum-bit gate operation, an arbitrary quantum computation can be performed. The CZ gate operation is an operation of performing the following transformation:

$$\alpha_{00}|0\rangle |0\rangle + \alpha_{01}|0\rangle |1\rangle + \alpha_{10}|1\rangle$$
$$|0\rangle + \alpha_{11}|1\rangle |1\rangle \rightarrow \alpha_{00}|0\rangle |0\rangle + \alpha_{01}|0\rangle$$
$$|1\rangle + \alpha_{10}|1\rangle |0\rangle - \alpha_{11}|1\rangle |1\rangle \quad (11)$$

The principle of the CZ gate, which will be described below, is similar to the principle proposed by Xiao et al. (see, for example, "Y.-F. Xiao, X.-M. Lin, J. Gao, Y. Yang, Z.-F. Han, and G.-C. Guo, Phys. Rev. A 70, 042314 (2004)." "Y.-F. Xiao, Z.-F. Han, Y. Yang, and G.-C. Guo, Phys. Lett. A 330, 137 (2004)"). However, the CZ gate described below differs in physical implementation from that proposed by Xiao et al.

Figure 6:
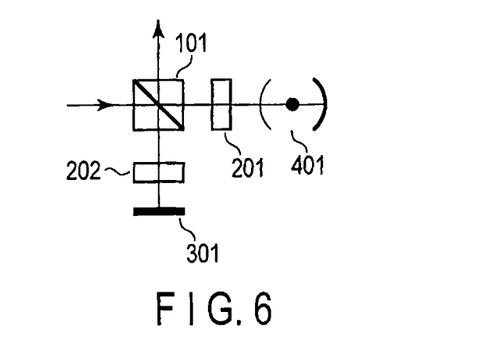
FIG. 6 is a view illustrating an optical system for performing a CZ gate operation associated with a quantum bit corresponding to an atom and a quantum bit corresponding to light in a second example.

The CZ gate described below is based on the CZ gate proposed by Duan et al. for a quantum bit expressed by polarization of a photon and a quantum bit expressed by the ground states of an atom (see, for example, "L.-M. Duan and H. J. Kimble, Physical Review Letters 92, 127902 (2004)"). Referring now to FIG. 6, a description will be given of an optical system for realizing the CZ gate. FIG. 6 shows an optical system for performing a CZ gate operation on a quantum bit expressed by an atom and a quantum bit expressed by light.

As shown in FIG. 6, the optical system comprises a polarized beam splitter (hereinafter referred to as "PBS") 101, two quarter-wavelength plates (hereinafter referred to as "QWPs") 201 and 202, a high reflectance mirror 301 and a one-side optical resonator 401 containing atoms having three levels.

The PBS 101 reflects vertically polarized light and passes therethrough horizontally polarized light.

The QWPs 201 and 202 can replace vertically polarized light and horizontally polarized light with each other by passing the light therethrough twice. Based on these functions, the PBS 101 and QWPs 201 and 202 are used to separate incident light and reflected light. In this case, circular polarized light enters the one-side optical resonator 401. If a Faraday rotator and a half-wavelength plate (hereinafter, HWP) are used in place of the QWPs, the incident light and reflected light can be separated from each other, and linearly-polarized light can be made to enter the one-side optical resonator 401. However, in this embodiment, the QWPs are used.

The high reflection mirror 301 reflects incident light in an opposite direction.

In the one-side optical resonator 401, incident light enters the resonator and is reflected therein when no strongly-coupled atoms exist in the resonator, while it does not enter the resonator but is reflected by the same when strongly-coupled atoms exist in the resonator. The frequency of a photon to be applied is set equal to the resonance frequency of the resonator. The one-side optical resonator 401 is, for example, Fabry-Perot resonator that includes one partially permissible mirror, and one highly reflective mirror.

Figure 7:
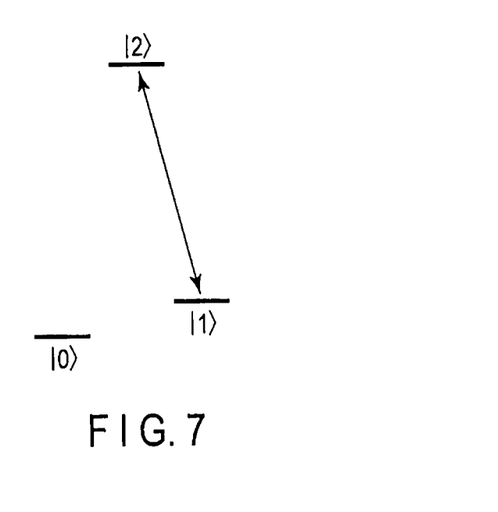
FIG. 7 is a view illustrating the energy levels of an atom having three levels.

Referring then to FIG. 7, a description will be given of the energy levels of an atom in the one-side optical resonator 401. In the example of FIG. 7, only a transition between $|1\rangle$-$|2\rangle$ is coupled with the incident light (resonator mode).

In the embodiment, stable states $|0\rangle$ and $|1\rangle$ of lower levels are used to express a quantum bit. The $|1\rangle$-$|2\rangle$ transition of an atom is strongly coupled with the incident light (resonator mode). The phenomenon "strong coupling with incident light (resonator mode)" means that the coupling constant of the $|1\rangle$-$|2\rangle$ transition of an atom and the resonator mode is greater than the relaxation rate of the atom and that of the resonator, that the transition frequency of the $|1\rangle$-$|2\rangle$ transition is equal to the frequency of incident light (i.e., equal to the resonance frequency of the resonator), and that the $|1\rangle$-$|2\rangle$ transition is coupled, under the selection rule, with a circular polarization of the incident light and is not coupled to a circular polarization of the incident light opposite to the first-mentioned one.

In contrast, a $|0\rangle$-$|2\rangle$ transition does not interact with the incident light (resonator mode) because of a detuning frequency. For facilitating the description, the incident light is regarded as a single photon pulse. In the embodiment, coherent light can be also used as the incident light. In this case, the same result as can be obtained using a single photon pulse can be obtained if application of the light is stopped when one photon is detected. Assume here that the coherent light is as weak as enabling vacuum Rabi splitting to be observed in the system. The vacuum Rabi splitting is a phenomenon in which the spectrum of the light transmitted through the resonator is split by the coupling of the resonator and an atom.

The starting state is set as follows:

$$|\psi_0\rangle = \alpha_{00}|0\rangle |V\rangle + \alpha_{01}|0\rangle |H\rangle + \alpha_{10}|1\rangle |V\rangle + \alpha_{11}|1\rangle$$
$$|H\rangle \quad (12)$$

where the first ket vector represents the state of an atom, and the second ket vector represents the polarized state of a photon. V and H mean vertical polarization (hereinafter, V polarization), and horizontal polarization (hereinafter, H polarization), respectively. V and H are assumed to correspond to "0" and "1" bits, respectively.

Referring back to FIG. 6, a V-polarized photon is reflected by the PBS 101 and guided to the highly reflective mirror 301. The photon reflected by the highly reflective mirror 301 and returned to the PBS 101 has its polarization H-polarized by the effect of the QWP 202, and therefore passes through the PBS 101 this time.

On the other hand, an H-polarized photon passes through the PBS 101 and reaches the one-side optical resonator 401. If the state of an atom in the one-side optical resonator 401 is $|0\rangle$, the resonator 401 has the same effect as a vacant resonator, and hence the photon enters the resonator 401 and is reflected therein. In contrast, if the state of the atom in the one-side optical resonator 401 is $|1\rangle$, the photon cannot enter the resonator 401 and is reflected therefrom because of the strong coupling of the resonator 401 and the atom.

As is evident from simple classic optical computation, the photon that entered the one-side optical resonator 401 differs by 180 degrees in phase from the photon that did not enter the same. Utilizing this fact, a feature that the phase of the photon is reversed only when the photon is H-polarized and the state of the atom is $|1\rangle$ can be realized. This is a CZ gate in which the ground states $|0\rangle$ and $|1\rangle$ are used as a control bit, and the V-polarized photon state $|V\rangle$ and the H-polarized photon state $|H\rangle$ are used as a target bit. This CZ gate performs such a transformation as expressed by the following mathematical expression. In this expression, the replacement of $|H\rangle$ and $|V\rangle$ is caused by the effects of the QWPs 201 and 202.

$$|\psi_0\rangle = \alpha_{00}|0\rangle |V\rangle + \alpha_{01}|0\rangle |H\rangle + \alpha_{10}|1\rangle |V\rangle + \alpha_{11}|1\rangle |$$
$$H\rangle \rightarrow |\omega_1\rangle = \alpha_{00}|0\rangle |H\rangle + \alpha_{01}|0\rangle |V\rangle + \alpha_{10}|1\rangle$$
$$|H\rangle - \alpha_{11}|1\rangle |V\rangle \quad (13)$$

As described above, a CZ gate can be realized for a quantum bit corresponding to an atom and a quantum bit corresponding to a photon simply by applying the photon to a resonator strongly coupled with the atom, although the polarized states are replaced.

Figure 8:
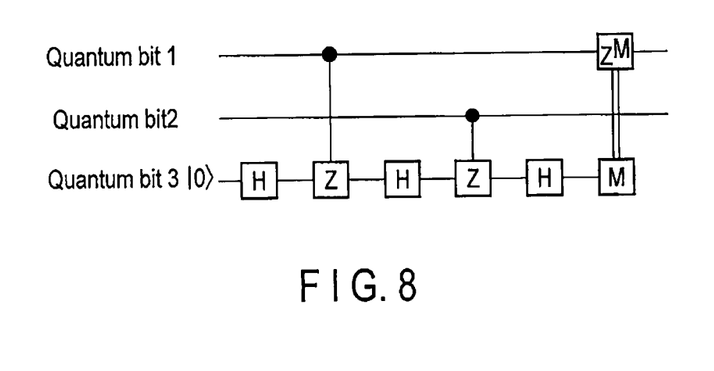
FIG. 8 is a view illustrating a quantum circuit utilizing an additional quantum bit 3 and equivalent to a CZ gate associated with quantum bits 1 and 2.

Referring then to FIG. 8, a description will be given of a process in which a CZ gate between atoms is realized using a CZ gate between an atom and a photon. FIG. 8 shows a quantum circuit using an additional quantum bit 3 and equivalent to a CZ gate for quantum bits 1 and 2.

As shown in FIG. 8, M represents bit reading, $Z^M$ represents a process in which if the result of M is 0, nothing is done, while if the result of M is 1, a phase reverse gate operation (hereinafter referred to as a Z gate operation) is performed. The Z gate operation is defined as follows:

$$|0\rangle \to |0\rangle, |1\rangle \to -|1\rangle \quad (14)$$

H represents an Hadamard gate (hereinafter referred to as an H gate), and is defined as follows:

$$|0\rangle \to \frac{|0\rangle + |1\rangle}{\sqrt{2}},$$
$$|1\rangle \to \frac{|0\rangle - |1\rangle}{\sqrt{2}} \quad (15)$$

The H gate can be realized using an HWP in the case of photon polarization.

The quantum circuit shown in FIG. 8 is equivalent to a CZ gate associated with quantum bits 1 and 2. Namely, a CZ gate operation associated with quantum bits 1 and 2 can be realized by an H gate operation associated with additional quantum bit 3, a CZ gate operation between quantum bits 1 and 3 and between quantum bits 2 and 3, measurement of quantum bit 3, and a Z gate operation performed on quantum bit 1 based on the measurement result. A brief description will now be given of this process. Assume here that the initial state of quantum bit 3 is set to |0>. Further, the starting state is defined as follows:

$$|\psi_0\rangle = (\alpha_{00}|00\rangle + \alpha_{01}|01\rangle + \alpha_{10}|10\rangle + \alpha_{11}|11\rangle)|0\rangle \quad (16)$$

In this case, the state immediately before bit reading M is given by $$|\psi_1\rangle = \frac{(\alpha_{00}|00\rangle + \alpha_{01}|01\rangle + \alpha_{10}|10\rangle - \alpha_{11}|11\rangle)|0\rangle + (\alpha_{00}|00\rangle + \alpha_{01}|01\rangle - \alpha_{10}|10\rangle + \alpha_{11}|11\rangle)|1\rangle}{\sqrt{2}} \quad (17)$$

In accordance with the result of bit reading M performed afterward, quantum bits 1 and 2 vary as recited below.

Quantum bit 3 is $0 \to |\psi_2\rangle = \alpha_{00}|00\rangle + \alpha_{01}|01\rangle + \alpha_{10}|10\rangle - \alpha_{11}|11\rangle$ Quantum bit 3 is $0 \to |\psi_2\rangle = \alpha_{00}|00\rangle + \alpha_{01}|01\rangle - \alpha_{10}|10\rangle + \alpha_{11}|11\rangle \quad (18)$ Accordingly, if nothing is performed when quantum bit 3 is 0, and if a Z gate operation is performed on quantum bit 1 when quantum bit 3 is 1, the following state is assumed:

$$|\psi_3\rangle = \alpha_{00}|00\rangle + \alpha_{01}|01\rangle + \alpha_{10}|10\rangle - \alpha_{11}|11\rangle \quad (19)$$

Thus, a CZ gate for quantum bits 1 and 2 can be realized using the quantum circuit shown in FIG. 8.

Further, a Z gate for an atom can be realized by Raman transition. The Raman transition is a phenomenon in which Rabi vibration is caused between |0> and |1> by the light having two frequencies that have a frequency difference equal to the |0>-|1> transition frequency and do not resonate with the |0>-|2> transition and the |1>-|2> transition.

To perform a CZ gate operation between atoms, it is sufficient if in the quantum circuit of FIG. 8, quantum bits 1 and 2 are expressed by the respective states of the atoms, and quantum bit 3 is expressed by polarization of a photon, thereby performing a CZ gate operation associated with quantum bits 1 and 3 and with quantum bits 2 and 3, using the atom-photon CZ gate shown in FIG. 6.

Figure 9:
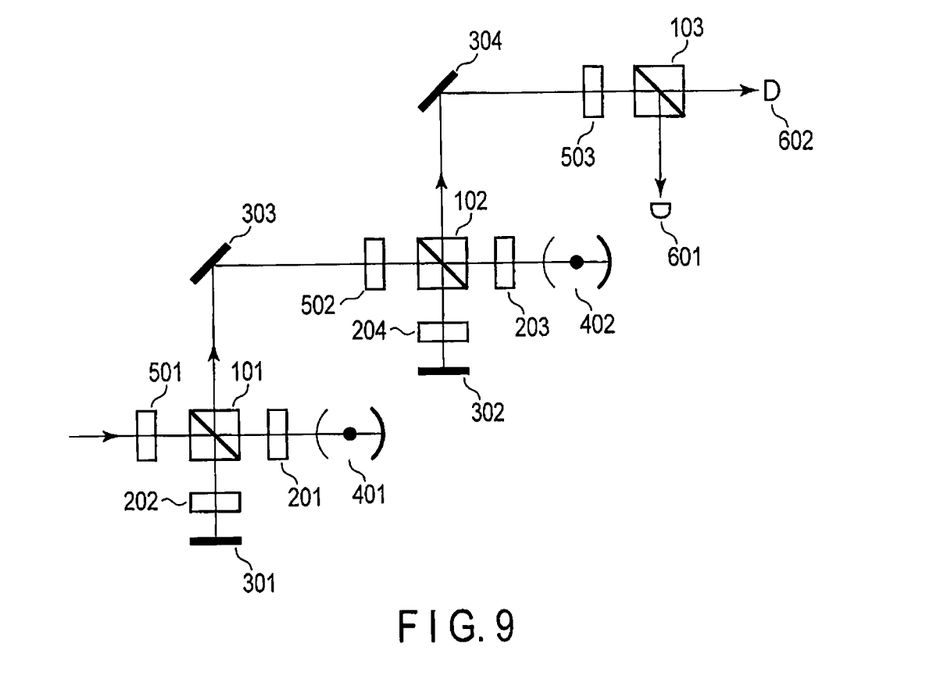
FIG. 9 is a view illustrating an optical system for performing a CZ gate operation between atoms.

Referring then to FIG. 9, a description will be given of realization of the quantum circuit shown in FIG. 8, using the atom-photon CZ gate shown in FIG. 6. FIG. 9 shows an optical system for performing a CZ gate operation between an atom and a photon.

As shown in FIG. 9, the optical system comprises PBSs 101, 102 and 103, QWPs 201, 202, 203 and 204, highly reflective mirrors 301, 302, 303 and 304, one-side optical resonators 401 and 402, HWPs 501, 502 and 503, and photodetectors 601 and 602.

The HWPs 501, 502 and 503 are designed to a thickness that enables ordinary and extraordinary light beams of vertical incident light to be output with a phase difference an odd number of times the half wavelength of the light. In other words, the HWPs 501, 502 and 503 are birefringence plates having a thickness that enables two orthogonal polarized light beams to have a phase difference of 180 degrees. The HWPs 501, 502 and 503 realize an H gate for the above-mentioned polarized photon.

The photodetectors 601 and 602 detect whether a photon is received.

The other components are similar to those shown in FIG. 6.

The quantum bits 1, 2 and 3 shown in FIG. 8 correspond to atoms contained in the respective one-side optical resonators 401 and 402 shown in FIG. 9, and the photon applied to the system shown in FIG. 9. Further, the quantum bit corresponding to the photon assumes states |0> and |1> corresponding to the above-mentioned V-polarization and H-polarization.

In the CZ gate shown in FIG. 6, the polarization is switched in the last step as expressed by the above mathematical expression (13). To realize the quantum circuit of FIG. 8 by the optical system of FIG. 9 in consideration of the switching, it is sufficient if the HWPs 502 and 503 perform a gate operation (hereinafter referred to an H' gate operation) different only in sign from the above-mentioned H gate operation and defined by the following mathematical expressions:

$$|0\rangle \to \frac{|0\rangle - |1\rangle}{\sqrt{2}},$$
$$|1\rangle \to \frac{|0\rangle + |1\rangle}{\sqrt{2}} \quad (20)$$

The H' gate operation is equivalent to an H gate operation performed after a NOT gate operation.

Further, if the HWP 501 also performs the H' gate operation, H-polarized light is used as the incident light, instead of V-polarized light. For easy understanding of the HWPs, hereinafter, the HWPs are supposed to be all used for the H' gate operation, and the incident light is supposed to be H-polarized light.

As is evident from the above, the optical system of FIG. 9 can realize a CZ gate operation between atoms by means of light. However, it is still unclear how the optical system is constructed to increase the number of quantum bits. In the second example, a certain extensible structure for increasing the number of quantum bits principally as far as possible in the quantum computer utilizing the CZ gate shown in FIG. 9 will be proposed.

The first two 101 and 102 of the three PBSs shown in FIG. 9 are used to perform a CZ gate operation between an atom and a photon, and the last PBS 103 is used to measure polarized light. To impart extensibility to the quantum computer, one PBS is made to be able to realize these two functions. To this end, a special mirror (hereinafter referred to as a switchable mirror) is employed, which has a variable reflectance so that it can function both as a highly transmissible mirror and as a highly reflective mirror, as will be described later.

Figure 10:
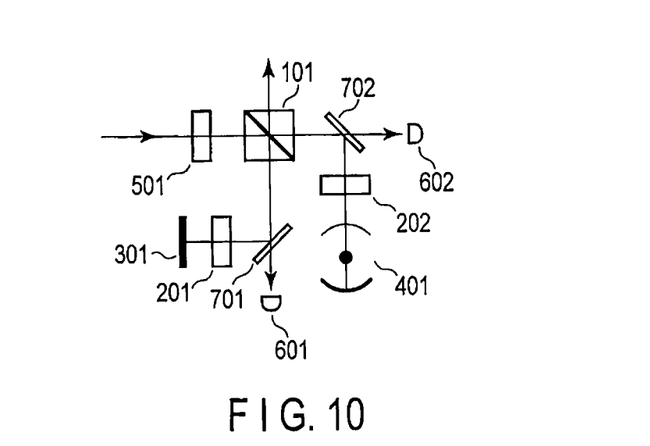
FIG. 10 is a view illustrating an optical system for imparting extensibility to a quantum computer according to the second example.

Referring to FIG. 10, a description will be given of an optical system for imparting extensibility to the quantum computer. FIG. 10 shows an optical system that uses the above-mentioned switchable mirror switchable between a high transmission function and a high reflectance function, thereby enabling one polarized beam splitter to realize both a gate operation and polarization measurement.

The optical system shown in FIG. 10 is obtained by adding, to the optical system of FIG. 6, an HWP 501, photodetectors 601 and 602, and switchable mirrors 701 and 702. The optical system shown in FIG. 10 performs a CZ gate operation between an atom and a photon after performing an H' gate operation if the switchable mirror functions as a highly reflective mirror, and performs polarization measurement after performing an H' gate operation if the switchable mirror functions as a highly transmissible mirror. If a plurality of optical systems similar to that of FIG. 10 are prepared and connected to each other via switchable mirrors, CZ gate operations can be performed on quantum bits corresponding to atoms in each pair of adjacent ones of the optical systems. Further, if optical systems are coupled via switchable mirrors, external light can be directly guided into any of the optical systems via the corresponding switchable mirror.

Figure 11:
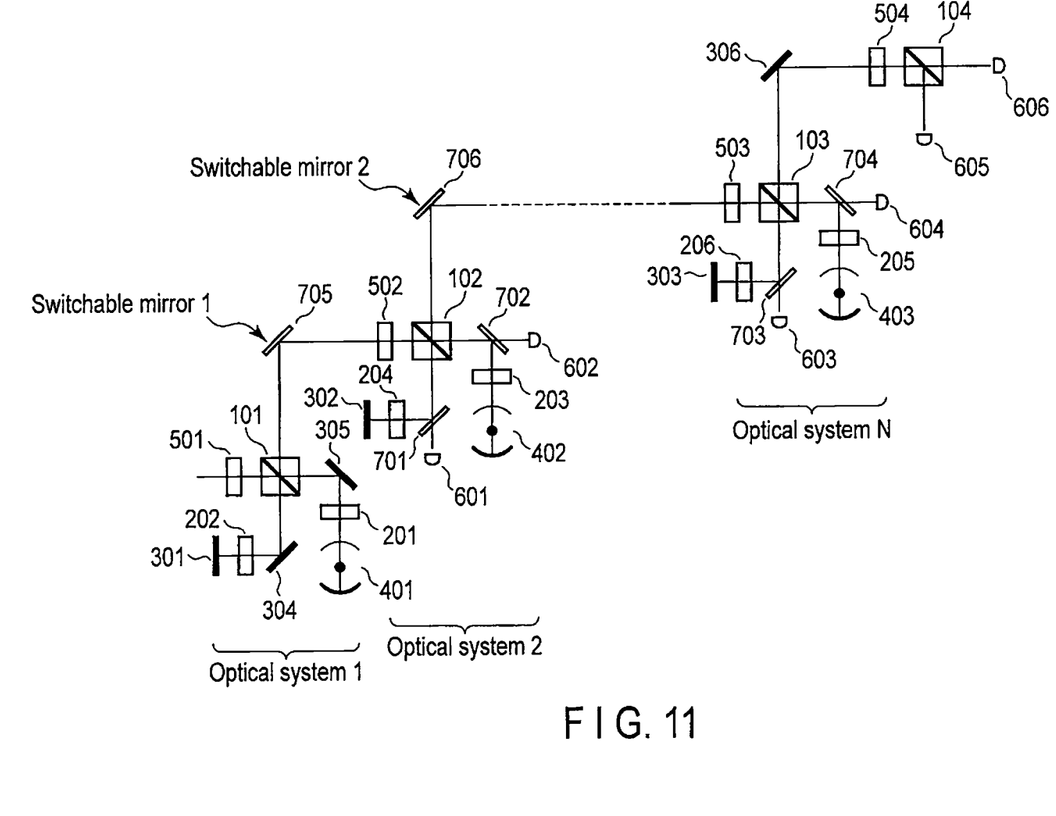
FIG. 11 is a view illustrating the quantum computer of the second example.

Referring then to FIG. 11, the way of connecting optical systems will be described. FIG. 11 shows the quantum computer according to the second example.

As shown in FIG. 11, optical systems are connected via switchable mirrors in the order of optical system 1, optical system 2, ..., optical system N (N: the total number of optical systems) from the left side. Namely, switchable mirrors k (k=1, 2, ..., N−1) connect optical system k to optical system (k+1). Each of the optical systems 2, ..., N shown in FIG. 11 is similar to the optical system shown in FIG. 10. However, optical system 1 shown in FIG. 11, and an optical system connected after optical system N, are not necessarily the same as that of FIG. 10. Namely, the optical system 1 may not incorporate a photodetector or a switchable mirror since it does not have to measure polarization of light. Similarly, the optical system after the optical system N only incorporates a HWP and a PBS for realizing an H' gate since it only has to measure polarization of light.

By connecting the optical systems as shown in FIG. 11, CZ gate operations can be performed on quantum bits corresponding to atoms in each pair of adjacent ones of the optical systems, with the result that a quantum computer can be realized which has as many quantum bits as possible.

The above-described first embodiment can provide a quantum computer that utilizes the $^3H_4$-$^3F_3$ transition of a $Pr^{3+}$ ion in a crystal and a laser of an optical telecommunication wavelength, thereby performing quantum gate operations advantageous in many points, enabling easy construction thereof, enabling itself to be compatible with quantum communication, achieving a long coherence time, and processing quantum information more appropriately and conveniently.

Second Embodiment

A description will now be given of a quantum memory for photons, according to a second embodiment, which utilizes the $^3H_4$-$^3F_3$ transition of a $Pr^{3+}$ ion in a crystal. In this embodiment, $YCl_3$ is used as the host crystal that satisfies the above-mentioned three conditions, as in the first embodiment. However, the host crystal is not limited to this, but may be such a crystal as $LuCl_3$. It is sufficient if the host crystal satisfies the three conditions.

"J. J. Longdell, E. Fraval, M. J. Sellars, and N. B. Manson, Phys. Rev. Lett. 95, 063601 (2005)" discloses optical storage using $Pr^{3+}$:$Y_2SiO_5$. This storage can directly be used as a quantum memory for photons in principle. The method disclosed therein is employed as a method for realizing the quantum memory of the second embodiment.

Figure 12:
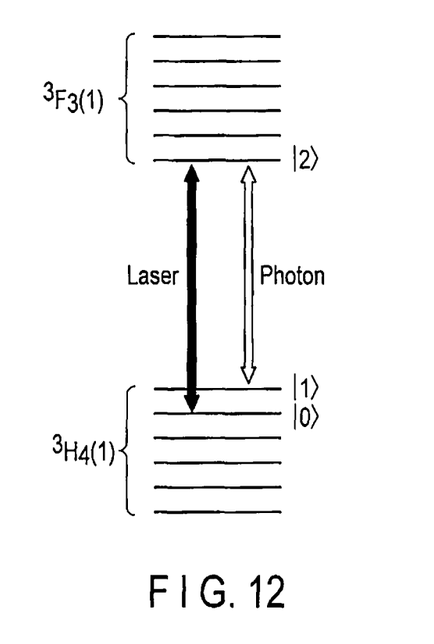
FIG. 12 is a view illustrating a state assumed in a quantum memory according to a second embodiment, in which state a photon, a laser beam and optical transition of a $Pr^{3+}$ ion are coupled.

In "J. J. Longdell*, E. Fraval, M. J. Sellars, and N. B. Manson, Phys. Rev. Lett. 95, 063601 (2005)," the $^3H_4$-$^1D_2$ transition of a $Pr^{3+}$ ion is utilized, and the stored wavelength of light is 606 nm. The quantum memory of the second embodiment is characterized in that the wavelength of a photon that can be held in the memory is equal to the $^3H_4$-$^3F_3$ transition, and falls within the optical telecommunication band. FIG. 12 shows the relationship, in the second embodiment, between a photon to be held, the frequency of a laser used for the storage, and transition of a $Pr^{3+}$ ion. In FIG. 12, |0> and |1> are used as states of the higher two levels included in the six hyperfine levels of $^3H_4(1)$, and |2> is used as a state of the lowest level included in the six hyperfine levels of $^3F_3(1)$. However, other hyperfine level states may be used as |0>, |1> and |2>.

Further, as in the first embodiment, the second embodiment uses, as a light source, a semiconductor laser with a variable-frequency external resonator providing a very stable frequency (a frequency fluctuation of approx. 1 kHz or less), which can supply a laser beam resonating with the $^3H_4$-$^3F_3$ transition.

When photon quantum information is stored, the $Pr^{3+}$ ion is initially set to |1>, a photon to be stored (and resonating with a |1>-|2> transition) is made to enter the host crystal, with a laser beam resonating with a |0>-|2> transition kept applied to the crystal, and application of the laser beam is gradually stopped. As a result, quantum information corresponding to the photon is stored as the states |0> and |1> of the $Pr^{3+}$ ion. When reading the stored information, the laser beam resonating with the |0>-|2> transition is gradually applied. For particulars concerning this memory, see "J. J. Longdell*, E. Fraval, M. J. Sellars, and N. B. Manson, Phys. Rev. Lett. 95, 063601 (2005)."

As described above, the second embodiment can realize a quantum memory that utilizes the $^3H_4$-$^3F_3$ transition of a $Pr^{3+}$ ion in a crystal and a laser of an optical telecommunication wavelength, thereby performing quantum gate operations advantageous in many points, enabling easy construction thereof, enabling itself to be compatible with quantum communication, achieving a long coherence time, and processing quantum information more appropriately and conveniently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum computer comprising:
   a crystal doped with a $Pr^{3+}$ ion and formed of $Pr^{3+}$:$YCl_3$, a $Y^{3+}$ and a $Cl^-$ having nuclear spins of smallest magnetic moments among ions having a valence of +3 and ions having a valence of −1, respectively;

an optical resonator containing the crystal and having a resonator mode that couples to a transition between one hyperfine level of $^3H_4(1)$ levels of the $Pr^{3+}$ ion in the crystal and one hyperfine level of $^3F_3(1)$ levels of the $Pr^{3+}$ ion; and a light source configured to supply a laser beam resonating with a $^3H_4(1)$-$^3F_3(1)$ transition of the $Pr^{3+}$ ion, a host crystal included in the crystal satisfying three conditions recited below:

a first condition that maximum phonon energy of the host crystal is not more than $350\,cm^{-1}$ to satisfy the condition that a homogenous broadening of a $^3F_3(1)$ level of the $Pr^{3+}$ ion resulting from relaxation due to phonon emission is smaller than respective hyperfine splits of a $^3H_4(1)$ level and the $^3F_3(1)$ level of the $Pr^{3+}$ ion;

a second condition that a site of the $Pr^{3+}$ ion does not have inversion symmetry, and the $Pr^{3+}$ ion has a Stark level in which the $^3H_4(1)$ level and the $^3F_3(1)$ level of the $Pr^{3+}$ ion are not degenerate; and a third condition that each atom in the host crystal has no electronic magnetic moment.

2. A quantum memory comprising:

a crystal doped with a $Pr^{3+}$ ion and formed of $Pr^{3+}$:$YCl_3$, a $Y^{3+}$ and a $Cl^-$ having nuclear spins of smallest magnetic moments among ions having a valence of +3 and ions having a valence of −1, respectively, the crystal being configured to store quantum information indicating a photon that couples with a transition between one hyperfine level of $^3H_4(1)$ levels of the $Pr^{3+}$ ion and one hyperfine level of $^3F_3(1)$ levels of the $Pr^{3+}$ ion; and a light source configured to supply a laser beam resonating with a $^3H_4(1)$-$^3F_3(1)$ transition of the $Pr^{3+}$ ion, a host crystal included in the crystal satisfying three conditions recited below:

a first condition that maximum phonon energy of the host crystal is not more than $350\,cm^{-1}$ to satisfy the condition that a homogenous broadening of a $^3F_3(1)$ level of the $Pr^{3+}$ ion resulting from relaxation due to phonon emission is smaller than respective hyperfine splits of a $^3H_4(1)$ level and the $^3F_3(1)$ level of the $Pr^{3+}$ ion;

a second condition that a site of the $Pr^{3+}$ ion does not have inversion symmetry, and the $Pr^{3+}$ ion has a Stark level in which the $^3H_4(1)$ level and the $^3F_3(1)$ level of the $Pr^{3+}$ ion are not degenerate; and a third condition that each atom (ion) in the host crystal has no electronic magnetic moment.

3. A quantum computer comprising:

a crystal doped with a $Pr^{3+}$ ion and formed of $Pr^{3+}$: $LuCl_3$, a $Lu^{3+}$ and a $Cl^-$ having nuclear spins of second smallest magnetic moments among ions having a valence of +3 and ions having a valence of −1, respectively;

an optical resonator containing the crystal and having a resonator mode that couples to a transition between one hyperfine level of $^3H_4(1)$ levels of the $Pr^{3+}$ ion in the crystal and one hyperfine level of $^3F_3(1)$ levels of the $Pr^{3+}$ ion; and a light source configured to supply a laser beam resonating with a $^3H_4(1)$-$^3F_3(1)$ transition of the $Pr^{3+}$ ion, a host crystal included in the crystal satisfying three conditions recited below:

a first condition that maximum phonon energy of the host crystal is not more than $350\,cm^{-1}$ to satisfy the condition that a homogenous broadening of a $^3F_3(1)$ level of the $Pr^{3+}$ ion resulting from relaxation due to phonon emission is smaller than respective hyperfine splits of a $^3H_4(1)$ level and the $^3F_3(1)$ level of the $Pr^{3+}$ ion;

a second condition that a site of the $Pr^{3+}$ ion does not have inversion symmetry, and the $Pr^{3+}$ ion has a Stark level in which the $^3H_4(1)$ level and the $^3F_3(1)$ level of the $Pr^{3+}$ ion are not degenerate; and a third condition that each atom in the host crystal has no electronic magnetic moment.

4. A quantum memory comprising:

a crystal doped with a $Pr^{3+}$ ion and formed of $Pr^{3+}$:$LuCl_3$, a $Lu^{3+}$ and a $Cl^-$ having nuclear spins of second smallest magnetic moments among ions having a valence of +3 and ions having a valence of −1, respectively, the crystal being configured to store quantum information indicating a photon that couples with a transition between one hyperfine level of $^3H_4(1)$ levels of the $Pr^{3+}$ ion and one hyperfine level of $^3F_3(1)$ levels of the $Pr^{3+}$ ion; and a light source configured to supply a laser beam resonating with a $^3H_4(1)$-$^3F_3(1)$ transition of the $Pr^{3+}$ ion, a host crystal included in the crystal satisfying three conditions recited below:

a first condition that maximum phonon energy of the host crystal is not more than $350\,cm^{-1}$ to satisfy the condition that a homogenous broadening of a $^3F_3(1)$ level of the $Pr^{3+}$ ion resulting from relaxation due to phonon emission is smaller than respective hyperfine splits of a $^3H_4(1)$ level and the $^3F_3(1)$ level of the $Pr^{3+}$ ion;

a second condition that a site of the $Pr^{3+}$ ion does not have inversion symmetry, and the $Pr^{3+}$ ion has a Stark level in which the $^3H_4(1)$ level and the $^3F_3(1)$ level of the $Pr^{3+}$ ion are not degenerate; and a third condition that each atom (ion) in the host crystal has no electronic magnetic moment.

* * * * *